(No Model.) 3 Sheets—Sheet 2.

J. HILL.
GRAIN DRIER.

No. 405,214. Patented June 11, 1889.

WITNESSES:

INVENTOR:

ATTORNEYS.

(No Model.) 3 Sheets—Sheet 3.

J. HILL.
GRAIN DRIER.

No. 405,214. Patented June 11, 1889.

WITNESSES:
INVENTOR:

UNITED STATES PATENT OFFICE.

JAMES HILL, OF NEWARK, NEW JERSEY.

GRAIN-DRIER.

SPECIFICATION forming part of Letters Patent No. 405,214, dated June 11, 1889.

Application filed August 21, 1888. Serial No. 283,350. (No model.)

*To all whom it may concern:*

Be it known that I, JAMES HILL, of Newark, in the county of Essex and State of New Jersey, have invented a new and Improved Grain-Drier, of which the following is a full, clear, and exact description.

In the successful and proper drying of grain it is not only necessary to quickly and thoroughly expel the moisture from the same, but it must be so done that it will be carried off as rapidly as it escapes from the grain, in order to leave the latter in a sweet condition. If the moisture driven from the grain in the drier is not instantly carried off, the foul odors of the moisture will settle back on the grain, and no amount of subsequent drying will sweeten the grain or kill the odors. To provide a grain-drier that will leave the grain in a sweetened condition, relieving it of all foul odors, is therefore the object of my invention, and I accomplish it by the novel combination and arrangement of parts hereinafter described and claimed.

Figure 1:
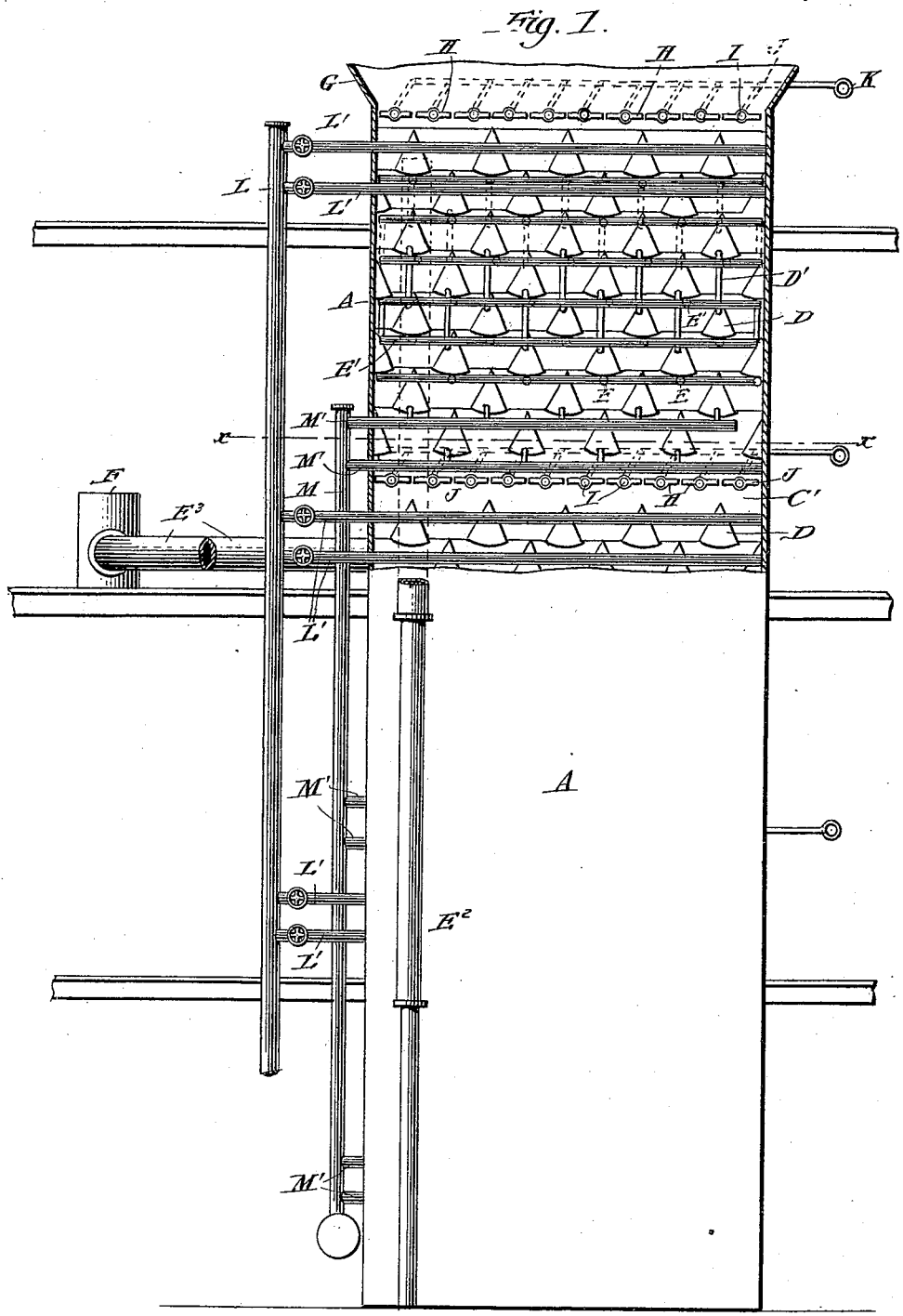
Figure 2:
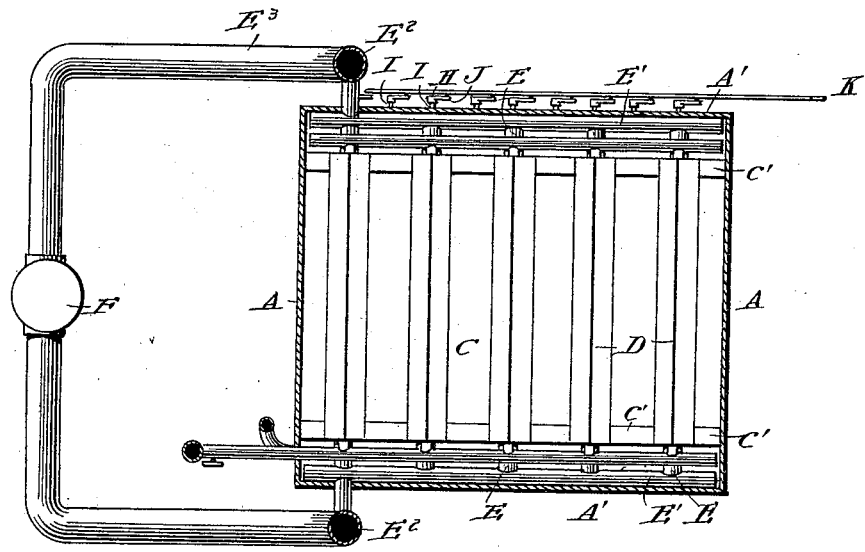
Figure 3:
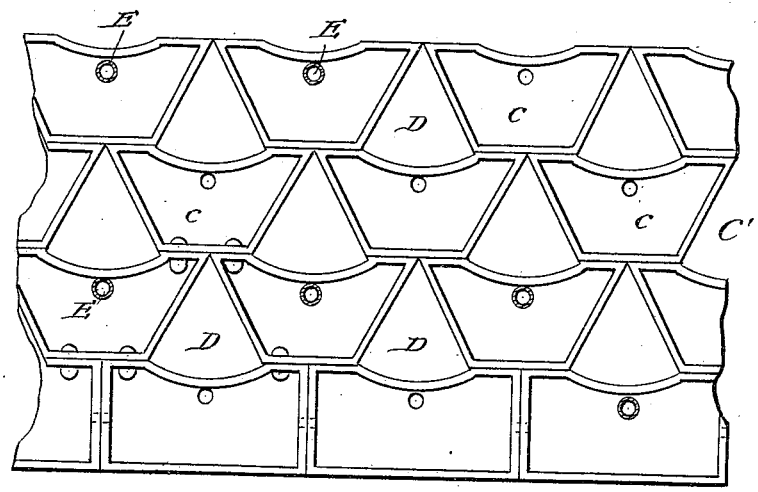
Figure 4:
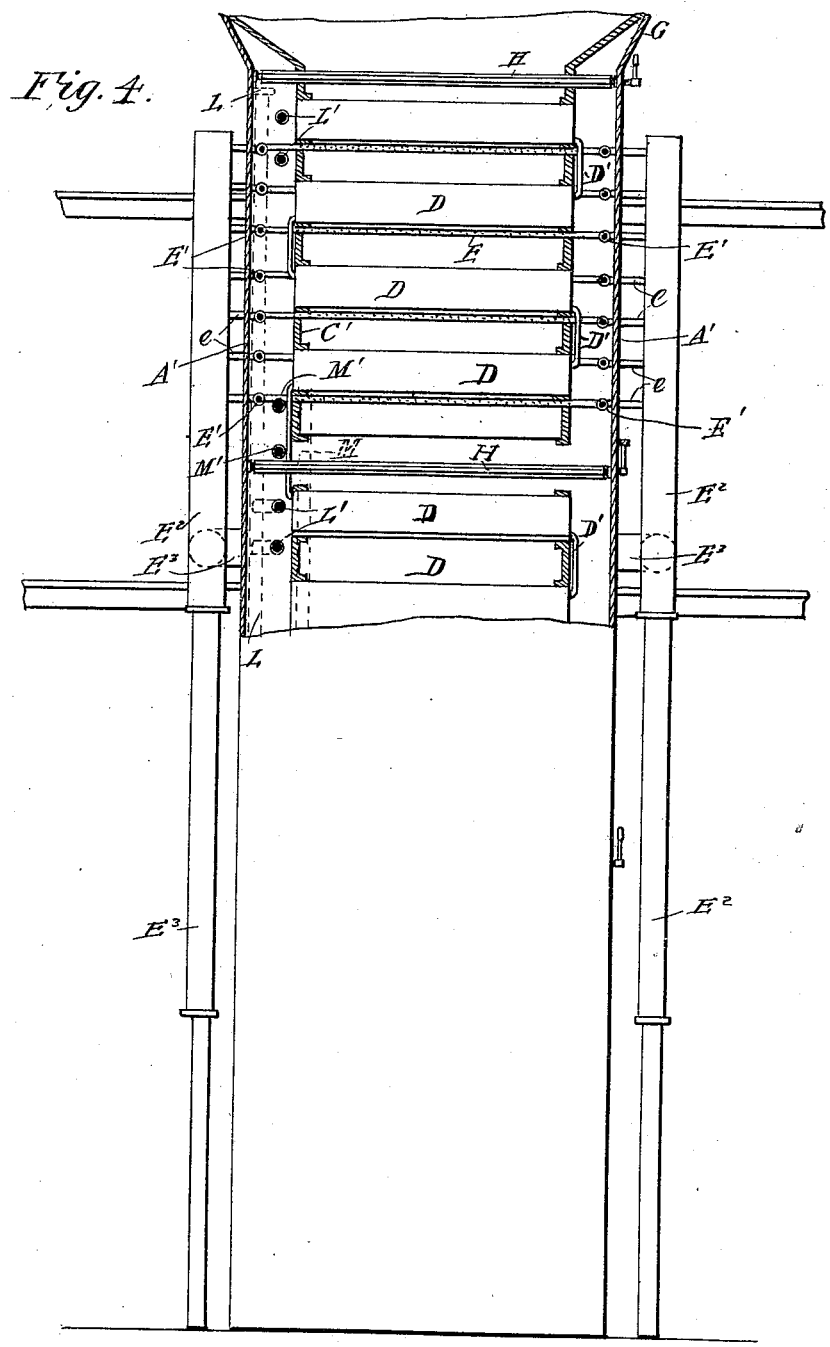

Figure 1 is a side view of a grain-drier embodying my improvements, a portion of the inclosing wall or shell of the drier being broken away. Fig. 2 is a horizontal section on line $x$ $x$ of Fig. 1. Fig. 3 is an enlarged view of part of one side of the drying-chamber; and Fig. 4 is an end view, the upper part being in section.

In grain-driers heretofore constructed the moisture from the grain being dried has been allowed to escape into chambers formed at the sides of the drying-chamber, and the moisture then allowed to escape to a chimney or exhausted by an exhaust-fan. With driers thus constructed, when an exhaust-fan is not employed, the escape of the moisture is not sufficiently rapid, and when an exhaust-fan is employed its force is in a great measure expended in the side chambers, and its direct effect in exhausting the air from the drying-chamber is not sufficiently great to carry off the moisture immediately it has escaped from the grain. In my drier the moisture is exhausted as rapidly as it escapes from the grain.

Referring to the drawings, the outer case or shell of the drier is preferably rectangular in shape, being formed with the end walls A A and front and rear walls A' A'. Within the outer case is formed the drying-chamber C, formed by the end walls A A of the outer case and the inner front and rear walls C' C', a space for the various pipes being formed between the walls C' C' of the drying-chamber and the front and rear walls A' A' of the outer case, as shown.

The side walls C' C' of the drying-chamber are preferably formed, as shown in Fig. 3, of sectional plates $c$, between which are secured the ends of the transversely-ranging steam-cells D, the said cells being preferably slightly rounded on the under side, but otherwise approximately triangular in cross-section. The steam-cells are arranged in series in such a manner that the apices of one set are in the horizontal plane of the bases of the next upper series, so that the grain in gravitating through the drier will be conducted in a zig-zag direction from one steam-cell to the other. A short distance below the base of each cell is placed transversely a perforated pipe E, the said perforated pipes extending through the walls C' C' of the drying-chamber and communicating with the pipes or "runs" E', extending horizontally at right angles to the perforated pipes E. The pipes E' in turn communicate by the pipes $e$ with the riser-pipes $E^2$, which in turn communicate with the pipes $E^3$, that extend to an exhaust-fan F, of any approved construction. By this construction it will be seen that the effect of the exhaust-fan is very great within the perforated pipes E, whereas in the constructions wherein the steam is allowed to escape from the drying-chamber into side chambers, and the latter connected with an exhaust-fan, the power of the fan is in a great measure lost in the said chambers, and a great portion of the moisture-escape pipes or apertures is but little affected.

The drying-chamber A is preferably divided into several floors or compartments, of which the upper compartment is provided with a hopper G. The top of the upper compartment is closed by a series of pivoted plates H, each secured to a shaft I, which shafts extend, preferably, to the outside of the drier, where they are connected by a crank-arm J with an operating-rod K, whereby the plates may be turned to open or close the entrance to the drier.

Between the several compartments similar dumping-plates H are provided, enabling communication to be established or cut off between the several compartments. The bottom of the drier will in practice be provided with the usual or any suitable gate or door for the final escape of the grain.

The two upper rows of steam-cells D of each compartment are in communication with the steam-supply pipes L' L', which branch from a main supply-pipe L, connected with any suitable generator, (not shown,) and the steam circulates through the various cells D, through the connecting-pipes D', and escapes from the bottom rows of cells D of each compartment through exhaust-pipes M' M' M to any suitable steam-trap. (Not shown.)

The riser-pipes $E^2$ are preferably of increasing sectional area as they approach the connecting-pipes $E^3$ of the fan, as shown.

In operation the grain is allowed to remain a short while in the upper compartment of the drying-chamber, and then allowed to gravitate to the next lower compartment, where it is allowed to remain a shorter time than in the first compartment, and so on, the period of detention being lessened from the uppermost compartment to the lowermost one.

Having fully described my invention, I claim as new and desire to secure by Letters Patent—

1. The combination, in a grain-drier, of a series of heating-cells extending across a closed drying-chamber and arranged in horizontal rows, a perforated pipe arranged under each heating-cell, and a main exhaust-pipe arranged outside of the drying-chamber and connected to each of the perforated pipes, substantially as described.

2. The combination, in a grain-drier, of a series of heating-cells extending across a closed drying-chamber and arranged in horizontal rows, the cells of alternate rows being arranged in different vertical planes, a perforated pipe arranged below each cell, a main exhaust-pipe arranged outside of the drying-chamber, and pipes leading from each of the perforated pipes to the exhaust-pipe, substantially as herein shown and described.

3. In a grain-drier, the combination, with a drying-chamber, of a series of heating-cells arranged in horizontal rows across the drying-chamber, each cell being of triangular shape in cross-section, with rounded under sides, and the cells of alternate rows being in different vertical planes and connected together, a perforated pipe arranged below each cell, a main exhaust-pipe outside of the drying-chamber, and pipes connecting each of the perforated pipes with the exhaust-pipe, substantially as herein shown and described.

JAMES HILL.

Witnesses:
C. SEDGWICK,
EDGAR TATE.